United States Patent
Bean

[11] Patent Number: 5,830,522
[45] Date of Patent: Nov. 3, 1998

[54] METHOD FOR PRESERVING SEAFOOD

[75] Inventor: Samuel Louis Bean, Wilmington, Del.

[73] Assignee: General Chemical Corporation, Parsippany, N.J.

[21] Appl. No.: 720,900

[22] Filed: Oct. 10, 1996

[51] Int. Cl.$^6$ .............................. A23C 25/00; A23C 29/00
[52] U.S. Cl. ............................................. 426/531; 426/643
[58] Field of Search .................................. 426/643, 262, 426/268, 269, 531, 542, 541

[56] References Cited

U.S. PATENT DOCUMENTS

| | | | |
|---|---|---|---|
| 2,206,066 | 7/1940 | Wallerstein | 426/269 |
| 2,451,313 | 10/1948 | Arengo-Jones | 426/269 |
| 2,589,591 | 3/1952 | Xander | 426/268 |
| 3,305,366 | 2/1967 | Sutton | 426/262 |
| 3,342,610 | 9/1967 | Molsberry | 426/262 |
| 3,982,030 | 9/1976 | Alsina | 426/643 |
| 4,006,257 | 2/1977 | Kolk | 426/269 |
| 4,279,934 | 7/1981 | Hutchison | 426/262 |
| 4,476,112 | 10/1984 | Aversano | 426/268 |
| 4,795,576 | 1/1989 | Bean et al. | 8/107 |
| 4,956,190 | 9/1990 | Chawan | 426/269 |
| 5,017,301 | 5/1991 | Bean et al. | 252/105 |
| 5,126,153 | 6/1992 | Beck | 426/269 |
| 5,162,127 | 11/1992 | Weiss | 426/268 |

OTHER PUBLICATIONS

McEvily 1991 Sulfite Alternative Prevents Shrimp Melanosis Food Technology Sep. 1991 pp. 80, 82–86.

Sapers 1993 Scientific Status Summary Food Technology Oct. 1993 pp. 75–84.

Brochure GCC TD–693, General Chemical Corporation, 1996.

*Primary Examiner*—Carolyn Paden
*Attorney, Agent, or Firm*—Arthur J. Plantamura

[57] ABSTRACT

Shrimp and other seafood can be preserved to extend their freshness shelf life by immersing them in an aqueous solution prepared by dissolving a dry mixture containing sodium metabisulfite with from 30 to 50% by weight of sodium sulfite. These solutions have excellent preservative action yet have very little or no odor of sulfur dioxide. The solutions are useful in a concentration of up to about 3% by weight.

6 Claims, 2 Drawing Sheets ive are considerable. The mixtures of the invention
METHOD FOR PRESERVING SEAFOOD This invention relates to an improved method for the preservation of the freshness of seafood. More particularly, this invention relates to an improved method for the preservation of shrimp using a blend of bisulfite and sulfite as the preservative.

BACKGROUND OF THE INVENTION

Fresh seafood has a limited shelf life before it spoils. The shelf life of some seafoods can be extended by cold storage and the like, but some seafood, particularly shrimp, has a shelf life of only a few days even when packed in ice.

Thus various treatments have been suggested to extend the shelf life of foods, particularly seafood.

Melanosis, or black spot, is an ailment that afflicts shrimp and results in the appearance of black spots, which is an indication of loss of freshness to the consumer. Shrimp, for example, darken and develop dark spots as they age. Thus shrimp can be examined visually to determine the degree of freshness. The test results for melanosis range from 0, that is, no spoilage, to 10, indicating extreme spoilage.

The usual treatment to reduce melanosis in shrimp is to treat the fresh shrimp with a dilute solution of sodium metabisulfite ($Na_2S_2O_5$) which forms sodium bisulfite ($NaHSO_3$) in solution. The usual application is by immersing the shrimp in a dilute (1.25% by weight) sodium metabisulfite solution for one minute. This treatment retards the spoilage of fresh shrimp, and the use of this treatment has become standard practice for shrimp just after the shrimp are harvested. Thus ocean harvested shrimp are treated on the shrimp boats as soon as they are harvested, and they may be treated again during the preparation and packaging steps prior to shipment.

Shrimp grown by aquaculture generally are harvested at night, treated with sodium metabisulfite solution in the field, iced, and taken to the processing plant. Here they are iced again, re-treated with sodium metabisulfite solution, cleaned, graded as to size, packed in paper cartons and quick-frozen. So great is the concern with freshness that the time from harvesting to freezing is usually no more than twelve hours.

Although effective to retard spoilage, a dilute, i.e., 1.25% by weight sodium metabisulfite solution, produces a noticeable and objectionable odor of sulfur dioxide. While this amount of sulfur dioxide is generally considered safe, nevertheless it can be irritating to workers in closed environments, such as in the hold of a ship where the chemical is being used, and to workers during processing of the shrimp that have been treated with the sodium metabisulfite. For persons who are allergic to sulfur dioxide, such as asthmatics, its presence may be dangerous. The odor of sulfur dioxide may even be detected by consumers, who object to it.

The use of sodium metabisulfite as a shrimp preservative has continued however, because it is very effective. However, good ventilation equipment must be provided when sodium metabisulfite is being used.

Thus the provision of an effective, safe and inexpensive substitute for sodium metabisulfite solutions to preserve the freshness life of seafood, particularly shrimp, while substantially reducing the odor, i.e., practically eliminating the odor, of sulfur dioxide, would be highly advantageous.

SUMMARY OF THE INVENTION

I have found that particular mixtures of sodium metabisulfite that include sodium sulfite are very effective for preserving the freshness of seafood, and shrimp in particular. The advantages of mixtures of the invention which employs sodium sulfite over sodium metabisulfite alone as a preservative are considerable. The mixtures of the invention produce a greatly reduced odor of sulfur dioxide. Thus the present invention is directed to treating seafood with a solution comprising sodium metabisulfite mixed with from about 30% up to 50%, and more suitably 35 to 45% of sodium sulfite. The preferred proportion is about 40% of the sodium sulfite. Aqueous solutions of these mixtures are safer to use than sodium metabisulfite alone in that they produce insignificant, or minimal sulfur dioxide odor, but they are substantially and practically as effective for preserving seafoods, particularly shrimp, without the extremely objectionable odor of sulfur dioxide that is present when using the sodium metabisulfite alone.

DETAILED DESCRIPTION OF THE INVENTION

In accordance with the method of the invention, a solution of at least 0.5% by weight and up to about 3% by weight of a mixture of sodium metabisulfite and sodium sulfite is applied to shrimp and other seafood. The solutions are applied by any suitable means that substantially saturates the shrimp with the sodium metabisulfite-sodium sulfite solution, such as by applying to the shrimp a thorough spraying or mist of the solution, or by immersing the seafood in the solution or by conveying it in mechanical fashion through the solution. The solutions can have a higher concentration, provided that the treated product has a residual content of less than about 100 ppm of sulfur dioxide, and preferably less than 80 ppm, in order to comply with various governmental guidelines.

Figure 1:
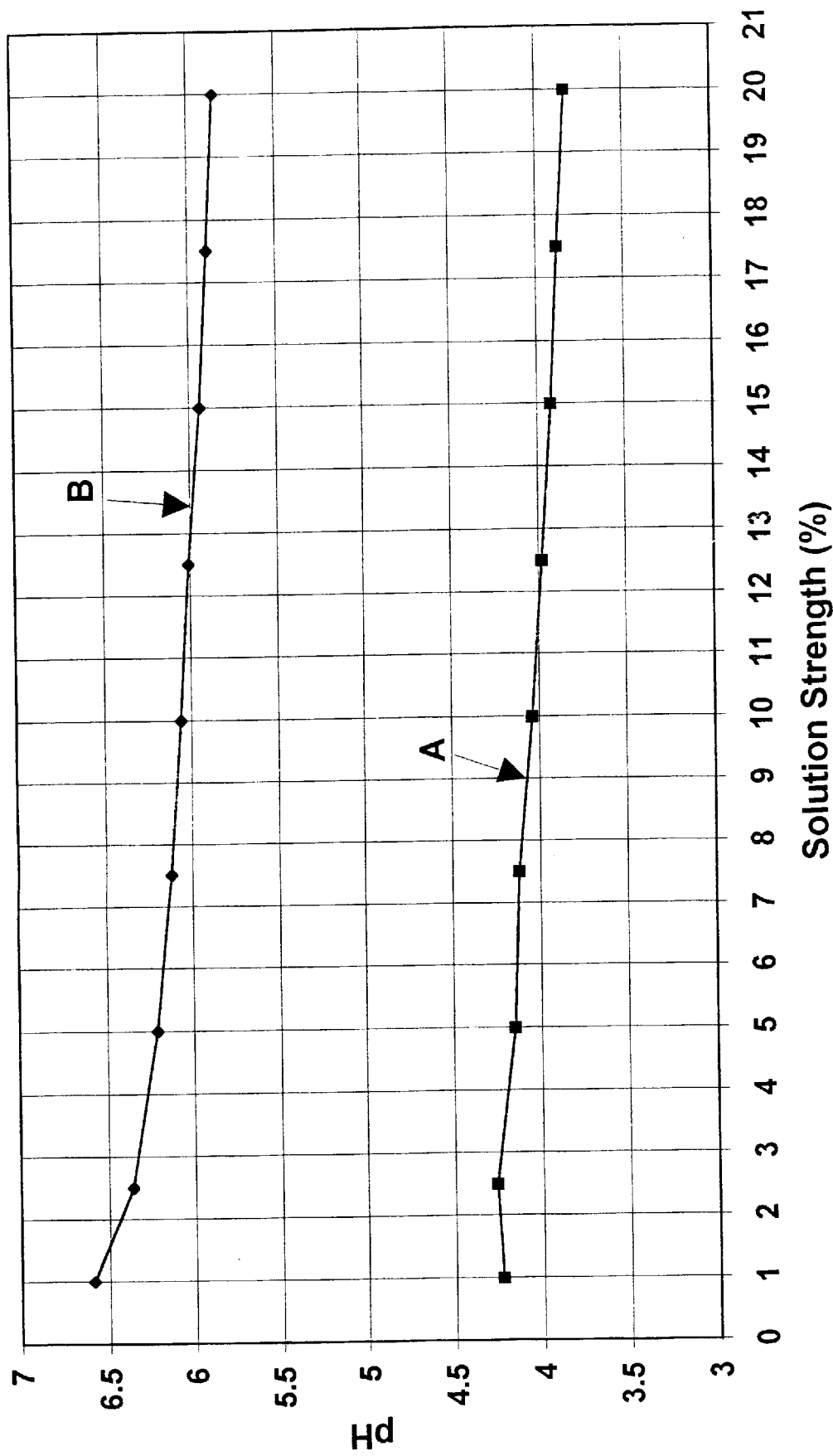
FIG. 1 is a graph of pH versus concentration for sodium metabisulfite compared to a mixture of sodium metabisulfite and sodium sulfite of the invention.
Figure 2:
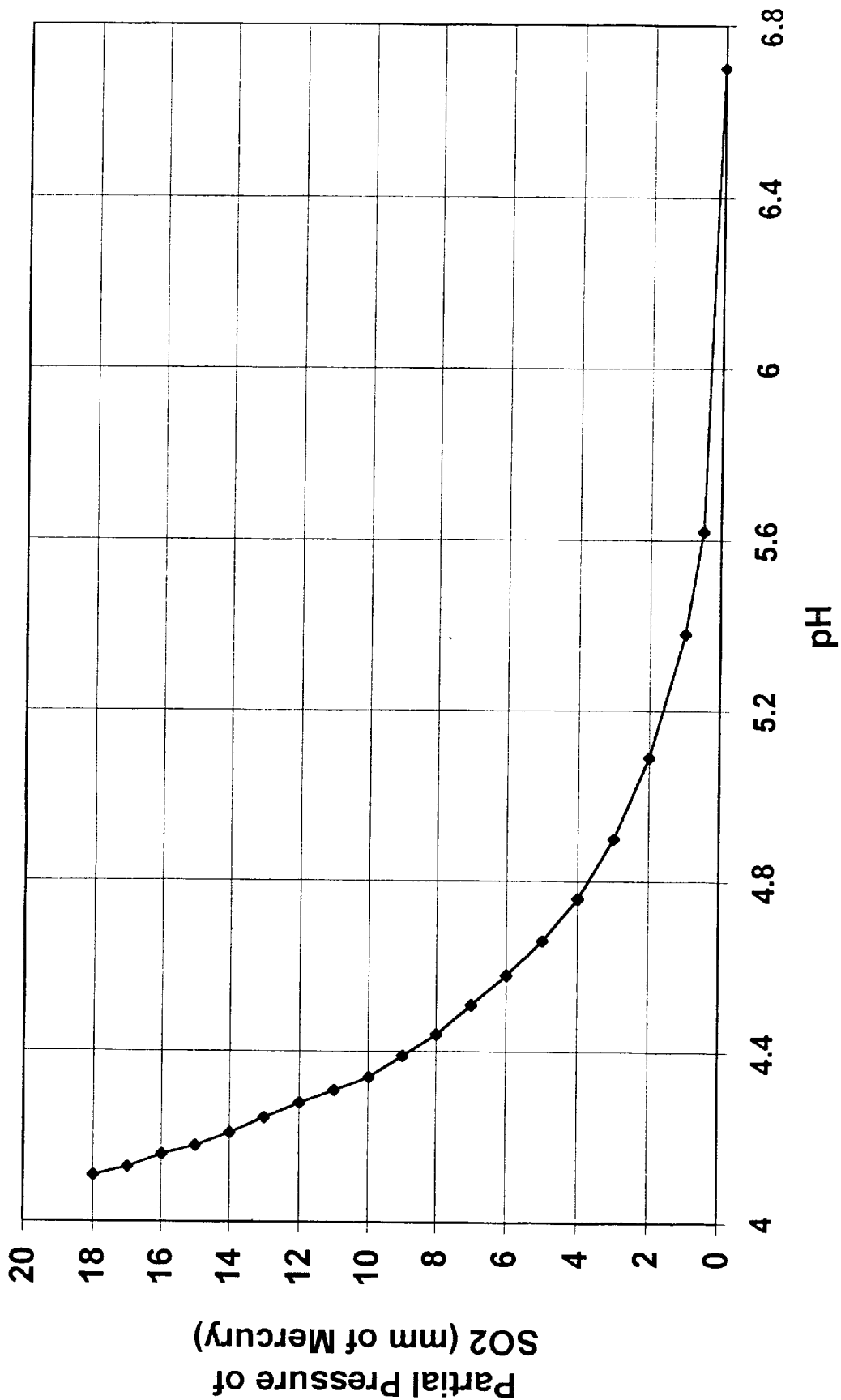
FIG. 2 is a graph showing the effect of pH on vapor pressure of sulfur dioxide over sodium metabisulfite solutions.

The reason for the high sulfur dioxide generation in sodium metabisulfite solutions can be explained by referring to FIGS. 1 and 2. FIG. 1 is a graph of pH versus concentration for sodium metabisulfite, line A, and a 60:40% by weight mixture of sodium metabisulfite and sodium sulfite, line B. Sodium metabisulfite has a low pH that decreases with its concentration; it is always at an acid pH, below about pH 4.5. This increases its vapor pressure as shown in FIG. 2. From FIG. 2 it is apparent that at a lower pH, the vapor pressure of sulfur dioxide metabisulfite solution is high, whereas at a higher pH of about 5.5–6.0, the vapor pressure of sulfur dioxide over the solution decreases rapidly. Thus the more acidic solution readily forms sulfur dioxide gas which volatilizes from the solution. This is borne out by experience. A 2% by weight solution of sodium metabisulfite in water has a strong odor of sulfur dioxide.

A mixture of sodium metabisulfite and sodium sulfite however, has a much higher pH, above 5.9 at any concentration: up to the solubility limit, and thus the volatilization of $SO_2$ is reduced. A 2% by weight solution of this mixture in water has no significant odor of sulfur dioxide.

The invention will be further described and tested with respect to shrimp, but it is to be understood that the present method can be used for other seafood, such as other shellfish.

In order to measure the spoilage of shrimp over time, the shrimp, either fresh or defrosted, were immersed in various aqueous solutions containing sulfites, using water as a control, for 1.0 minute. The shrimp were then packed in ice and examined every other day for a period of two weeks. The shrimp were graded for melanosis.

The following Table I illustrates the ratings, i.e., the degree of melanosis and descriptions for melanosis employed herein:

TABLE I

| Rating | Description |
| --- | --- |
| 0 | Absent |
| 2 | Slight, noticeable on some shrimp |
| 4 | Slight, noticeable on most shrimp |
| 6 | Moderate, noticeable on most shrimp |
| 8 | Heavy, noticeable on most shrimp |
| 10 | Heavy, totally unacceptable |

Table II below summarizes melanosis data for shrimp dipped in various solutions in a concentration of 1.0% by weight over time. Solution 1 was a 100% by weight of sodium metabisulfite solution; solutions 2 to 5 contained both sodium metabisulfite and sodium sulfite in the proportions shown. Solution 6 was 100% by weight of sodium sulfite solution. The Control was water. The data is presented as an average of three test results for the indicated elapsed number of days after treatment.

TABLE II

| | Melanosis Rating, Elapsed Days | | | | | | |
| --- | --- | --- | --- | --- | --- | --- | --- |
| Solution | 1 | 3 | 5 | 7 | 9 | 11 | 13 |
| 1 (100:0) | 0 | 0 | 2.3 | 4 | 5.7 | 7.3 | 8.7 |
| 2 (85:15) | 0 | 0 | 3.3 | 5.3 | 6.3 | 8.0 | 8.7 |
| 3 (60:40) | 0 | 0.7 | 3.0 | 5.0 | 6.0 | 8.3 | 8.7 |
| 4 (35:65) | 0 | 1.0 | 5.3 | 7.7 | 7.7 | 9.0 | 10.0 |
| 5 (12.5:87.5) | 0 | 2.0 | 5.7 | 6.3 | 6.7 | 8.0 | 9.3 |
| 6 (0:100) | 0 | 2.7 | 5.3 | 7.3 | 7.7 | 9.3 | 9.3 |
| Control | 1.7 | 4.3 | 6.7 | 8.7 | 9.0 | 9.7 | 10.0 |

Thus all of the sulfite-containing solutions reduced melanosis compared to the Control, and the solution of 100% sodium metabisulfite was the most effective. However, mixing up to about 40% of sodium sulfite with the sodium metabisulfite had very little negative effect on melanosis, but a dramatic effect on the residual odor of sulfur dioxide.

Increasing the concentration of the mixed sulfite solutions to 2.0% by weight did show some positive results, as shown below in Table III.

TABLE III

| | Melanosis Rating, Elapsed Days | | | | | | |
| --- | --- | --- | --- | --- | --- | --- | --- |
| Solution | 1 | 3 | 5 | 7 | 9 | 11 | 13 |
| 1 (100:0) | 0 | 0 | 0 | 7 | 3.3 | 4.3 | 5.7 |
| 2 (85:15) | 0 | 0 | 1.0 | 2.7 | 4.0 | 5.3 | 7.0 |
| 3 (60:40) | 0 | 0 | 0.7 | 3.0 | 3.7 | 5.0 | 6.3 |
| 4 (35:65) | 0 | 0 | 1.7 | 4.0 | 5.3 | 6.3 | 7.0 |
| 5 (12.5:87.5) | 0 | 0 | 1.7 | 3.3 | 5.0 | 6.7 | 7.3 |
| 6 (0:100) | 0 | 0 | 2.3 | 5.0 | 6.3 | 7.7 | 8.3 |
| Control | 0 | 3.3 | 6.7 | 8.7 | 8.7 | 9.7 | 10.0 |

It is apparent that some benefits are seen for sodium metabisulfite alone or in combination with minor amounts (less than 50%) of sodium sulfite. The melanosis ratings for up to 60:40 solutions remained below 7 after 13 days.

However, less concentrated solutions were less effective. 0.5% solutions did not prevent melanosis for longer than one week for any of the solutions.

The sulfite residuals in ppm on the shrimp treated with solutions of various concentration were also determined. The data is given below in Table IV as an average of three determinations.

TABLE IV

| | RESIDUAL SULFUR DIOXIDE, PPM | | |
| --- | --- | --- | --- |
| Solution | 0.5% | 1.0% | 2.0% |
| 1 (100:0) | 22.18 | 42.53 | 88.67 |
| 2 (85:15) | 31.39 | 34.50 | 67.33 |
| 3 (60:40) | 15.48 | 18.77 | 60.20 |
| 4 (35:65) | 28.61 | 44.51 | 25.57 |
| 5 (12.5:87.5) | 18.88 | 48.49 | 84.67 |
| 6 (0:100) | 12.53 | 48.49 | 84.67 |

It is apparent that none of the solutions reached the limit of 100 ppm. The residual sulfite concentration is lowest for a 1.0% solution of 60% sodium metabisulfite and 40% sodium sulfite. Coupled with the highly effective treatment with this solution for increasing shrimp shelf life, such solutions are both highly effective and greatly reduce the generation of $SO_2$.

The concentration of sodium metabisulfite and sodium sulfite used for treating foods can be varied, providing the residual sulfur dioxide equivalent in the food is below acceptable maximums. Increasing the concentration of the treating solution will prolong shelf life without increasing the odor of sulfur dioxide, but may increase the amount of residual sulfite remaining on the food.

Although the invention has been described in terms of specific tests and embodiments, one skilled in the art can substitute other tests and embodiments and these are meant to be included herein. The invention is only to be limited by the scope of the appended claims.

I claim:

1. A method of treating seafood to extend its shelf life comprising
   applying a saturating quantity to the food of an aqueous solution having a concentration of from about 0.5% up to about 3% by weight of a mixture of sodium sulfite and sodium metabisulfite wherein the proportion of sodium sulfite in the mixture is from about 30% to about 50%.

2. A method according to claim 1 wherein the concentration of said aqueous solution is adjusted so that the treated food has less than 100 ppm of residual sulfur dioxide.

3. A method according to claim 1 wherein the concentration of said aqueous solution is from about 0.5% to about 2% by weight of the mixed sodium metabisulfite and sodium sulfite.

4. A method according to claim 1 wherein said seafood is shrimp.

5. A method of treating seafood to extend its shelf life comprising
   immersing the food in an aqueous solution prepared by dissolving a dry mixture containing sodium sulfite and sodium metabisulfite wherein the proportional weight of sodium sulfite in the mixture is from about 35 to 45%.

6. The method according to claim 5 wherein the proportional weight of sodium sulfite in the mixture is about 40%.

* * * * *